United States Patent
Lerch et al.

[11] Patent Number: 5,416,050
[45] Date of Patent: May 16, 1995

[54] RED CERAMIC MOULDED BODIES AS WELL AS PROCESSES FOR THEIR PRODUCTION

[75] Inventors: Klaus Lerch; Peter Kuske, both of Krefeld; Walter Kröner, Cologne; Gunter Buxbaum, Krefeld, all of Germany

[73] Assignee: Bayer Aktiengesellschaft, Leverkusen, Germany

[21] Appl. No.: 279,710

[22] Filed: Jul. 25, 1994

Related U.S. Application Data

[63] Continuation of Ser. No. 32,786, Mar. 17, 1993, abandoned.

[30] Foreign Application Priority Data

Mar. 31, 1992 [DE] Germany ................. 42 10 501.3

[51] Int. Cl.$^6$ .................................................. C04B 33/00
[52] U.S. Cl. .................................. 501/141; 501/126
[58] Field of Search .............. 501/141, 126; 106/456, 106/457, 459; 264/66

[56] References Cited

U.S. PATENT DOCUMENTS 1,609,416 12/1926 Maynard .................... 501/141
3,802,900 4/1974 Broll et al. .
5,085,706 2/1992 Kuske et al. .................... 106/456

FOREIGN PATENT DOCUMENTS 0187331 7/1986 European Pat. Off. .
0220553 5/1987 European Pat. Off. .
0290908 11/1988 European Pat. Off. .
292924 1/1971 U.S.S.R. .

OTHER PUBLICATIONS

Laux, J., Aromatische Zwischenprodukte, 463773:350 (1925) no month.
Derwent Database, AN 90-365443 & JP 2 263 870 Oct. 1990.
Hakort, D., Glas-Email-Kermak-Technik (1971) Heft 1, 15–22 no month.
Gatzke, H., Keram. Z. 21 (1969) 219–224 no month.
Vocke, P., Ber. Dtsch. Keram. Ges. 63 (1986) 203–213 no month.

*Primary Examiner*—Mark L. Bell
*Assistant Examiner*—Michael Marcheschi
*Attorney, Agent, or Firm*—Connolly and Hutz

[57] ABSTRACT

A process for preparing red ceramic molded bodies by rapid firing is disclosed, wherein low Si-content iron oxides are employed. The process produces molded bodies having improved colouristic properties.

8 Claims, 1 Drawing Sheet

□ Example 1-6
△ Comparative Examples

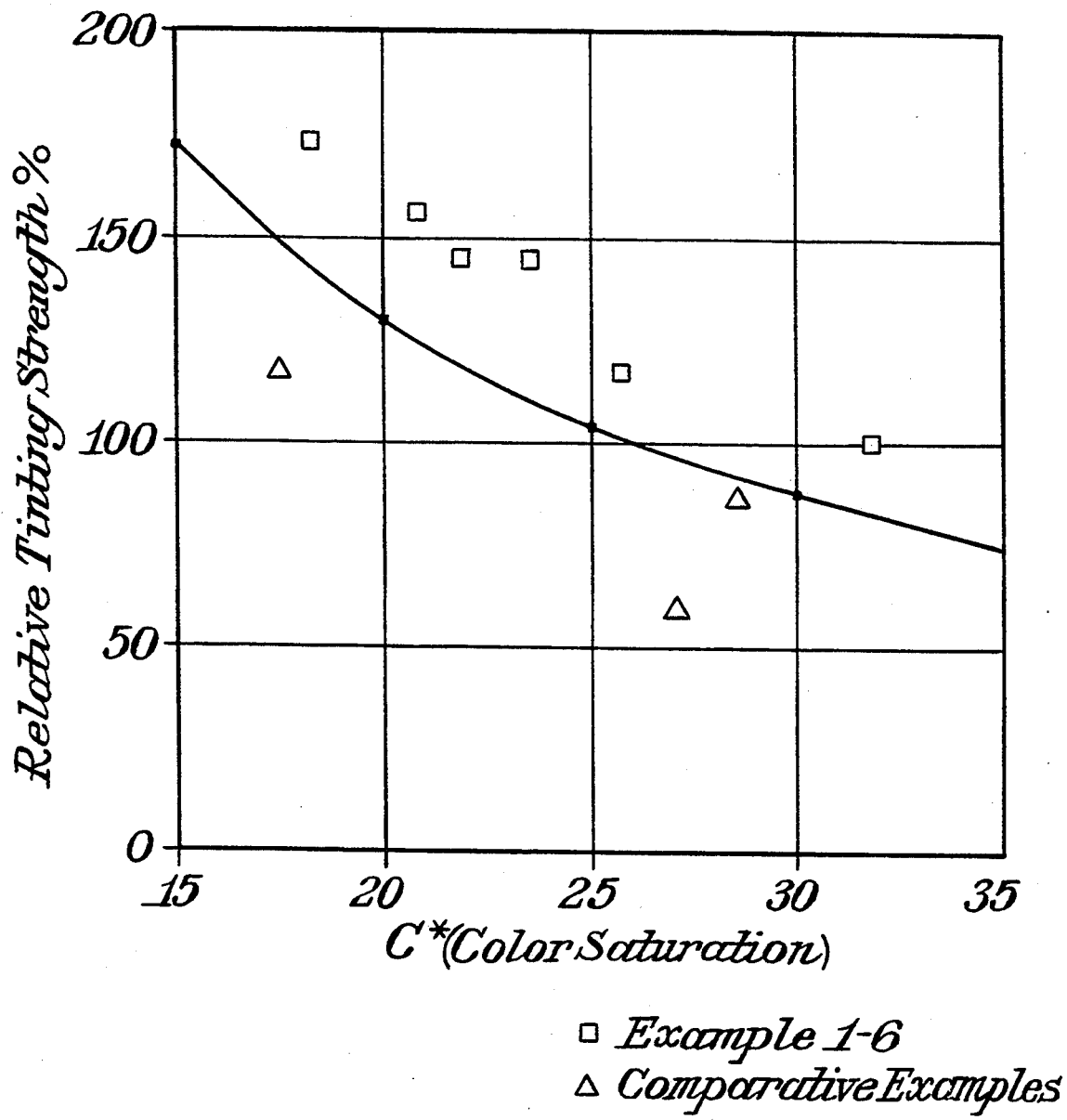

RED CERAMIC MOULDED BODIES AS WELL AS PROCESSES FOR THEIR PRODUCTION

This application is a continuation of application Ser. No. 08/032,786, filed on Mar. 17, 1993, now abandoned.

The present invention relates to red ceramic moulded bodies obtained in rapid firing, particularly tiles, which contain iron oxides as colouring components, as well as to a process for their production.

The rapid-firing process was introduced into stoneware tile production in order to reduce labour and energy costs (Gatzke, H: Rapid firing—preconditions, possibilities, limits: Keram. Z. 21 (1969) 219-224; Hakort, D: Advantages, limits and future aspects of ceramic rapid firing: Glas-Email-Keramik-Technik (1971) Heft 1, 15-22).

While water absorption and strength of rapid-fired products already satisfy the conventionally produced standard, an important quality-determining property, the uniform, aesthetic colouring of the pieces, still represents a problem (Vocke, P.: Ber. Dtsch. Keram. Ges. 63 (1986) 203-213). If in conventional firing red to brown shades are obtained, corresponding bodies in rapid firing yield an unpleasant greenish shade. In addition, when using conventional iron oxides, faintly coloured tiles are obtained which moreover, as an aesthetic defect, are always spotty. Intensification of the shade by increased addition of iron oxide is impossible, since other quality-determining properties of the ceramic tiles (e.g. water absorption, strength) are influenced unfavourably. Up to now the disadvantages described have prevented the use of conventional iron oxides for colouring ceramic tiles in rapid firing. Instead, according to U.S. Pat. No. 3,802,900, costly pigments, made by expensive occlusion processes are used, which in some cases contain toxicologically questionable constituents, such as, for example, CdS or CdSe. In addition these pigments do not yield the pleasant shades known from the conventional firing process.

The problem of the present invention is accordingly to make available ceramic bodies with which the Cotto and brick red shades known from the conventional firing process (tunnel kiln) can also be obtained in rapid firing and do not have the disadvantages aforementioned.

Surprisingly, it has now been found that by use of low-Si iron oxides in the rapid firing process, uniformly coloured tiles with an intense red colour can be obtained. This effect is even more surprising since the ceramic bodies themselves contain considerable amounts of $SiO_2$. For the colour purity of the ceramic moulded bodies a low Mn content is beneficial. For production of the ceramic bodies, the usual procedure is followed, except that an appropriately pure iron oxide is added to the bodies. The added amount can be 1-10 wt %, preferably 3-7 wt %, and the iron oxide can be added both as powder and as granular material.

When a ceramic produced by using a high-purity iron oxide in rapid firing and a corresponding ceramic which has been coloured by addition of a conventional iron oxide are compared, the former ceramic tile clearly shows the more uniform colouring.

To determine the shade the ceramics were tested colorimetrically. To this end the CIELAB data (DIN 6174) were determined with a colorimeter with Ulbricht globe (illumination conditions d/8°, standard light type C/2°) with inclusion of the surface reflection.

To determine the intensity of the colouring (relative tinting strength), the Kubelka-Munk function was first applied to the CIE coordinate Y (DIN 5033):

$$F = (1 - Y/100)^2 / (2 \times Y/100).$$

The relative tinting strength was then calculated as follows:

$$P = (F_{specimen}/F_{reference}) \times 100\%.$$

The reference chosen was the relative tinting strength of the moulded body produced in Example 1.

For equalization of the colorimeters, the CIELAB data of two ceramic standards of the British Ceramic Research Association Ltd. (obtainable from the Datacolor ACS ICS company, Dietlikon, Switzerland or any other large colorimeter manufacturer) were determined and the relative tinting strength was calculated as described. The results are assembled in Table 1.

BRIEF DESCRIPTION OF THE DRAWING

FIG. 1 shows a graphical comparison of relative tinting strength verse color saturation.

It can be concluded from FIG. 1 and Table 1 that red ceramic tiles with high relative tinting strength and saturation can be obtained by the process described herein. Saturation and relative tinting strength values that up to now were possible only in tunnel kiln firing are reached and in some cases even exceeded. On the relative tinting strength/colour saturation diagram, these aesthetically pleasing shades lie above the curve determined by the equation $C^* \times P = 2600$.

The result according to the invention appears also in the production of ceramics for the ware, sanitary or brick sector.

The present invention, therefore, relates to ceramic bodies which contain 1 to 10 wt %, preferably 3 to 7 wt %, of iron oxide pigments, calculated as $Fe_2O_3$, as the colouring component, which are characterized by the fact that the product of relative tinting strength and colour saturation exceeds 2600.

The iron oxides used preferably have Si contents of less than 0.5 wt % and Mn contents of less than 0.06 wt %, while iron oxides produced conventionally, e.g. according to DE-C 463 773, have Si contents of about 1 wt % and Mn contents of about 0.1 wt %. More preferably, the iron oxide pigments should have a Si content of 100 to less than 5000 ppm and a Mn content of 100 to less than 600 ppm.

The present invention, therefore, further relates to the process for production of ceramics in rapid firing, wherein the iron oxide used has an Si content of less than 0.5 wt % and an Mn content of less than 0.06 wt %. The particle size of the iron oxide used lies in the usual range (0.1-1 µm) for pigments. The shade can be adjusted via the particle size in the manner known to the expert. In this connection the pigment can be used both in the form of powder and of granulated material.

Both isomeric and needle-shaped iron oxides in all known crystal modifications can be used. Yellow (alpha-FeOOH), red (alpha-$Fe_2O_3$) and black ($Fe_3O_4$) iron oxide pigments are preferably used. By using alpha-FeOOH, Cotto red shades are obtained, and by using $Fe_2O_3$, brick-red shades.

The maximum firing temperature is usually 1180° to 1220° C., preferably about 1180° C.

The duration of firing is between 25 minutes and 6 hours, preferably 40–80 minutes. The expert can, however, easily vary the optimum firing conditions according to the properties of the other constituents of the batch.

In the following, the invention is described by way of example, which are in no way intended to be limiting. Comparative examples are then given in which conventional iron oxides were used for colouring and which led to unsatisfactory results (comparative examples 7–9). The CIELAB data are assembled in Table 1.

EXAMPLE 1

Stoneware clay from the Westerwald is prepared wet in a ball mill. 5 wt % of an iron oxide consisting of approximately isometric particles (alpha-FeOOH) of average size 0.5 μm and having a specific surface area of 12 $m^2/g$ and containing as minor constituents 0.035 wt % Mn, 0.015 wt % Si and 0.35 wt % Al (producible according to U.S. Pat. No. 4,620,879, e.g. Bayferrox 915, commercial product of Bayer AG) are added. The mixture is spray dried (7% residual moisture). Tiles of 95 mm×95 mm×6 mm are formed with a hydraulic press. The tiles are fired for 70 minutes in a roller kiln at a maximum temperature of 1180° C.

EXAMPLE 2

The procedure is as in Example 1, but the maximum furnace temperature is 1215° C.

EXAMPLE 3

The procedure is as in Example 1, but an iron oxide is used consisting of needle-shaped particles (alpha-$Fe_2O_3$) of average size 0.15×0.6 μm, having a specific surface area of 3.5 $m^2/g$ and containing as minor constituents 0.01 wt % Mn and 0.01 wt % Si (e.g. Bayferrox 1352, commercial product of Bayer AG).

EXAMPLE 4

The procedure is as in Example 3, but the maximum furnace temperature is 1215° C.

EXAMPLE 5

The procedure is as in Example 1, but an iron oxide is used consisting of needle-shaped particles (alpha-$Fe_2O_3$) of average size 0.2×0.8 μm, having a specific surface area of 3.0 $m^2/g$ and containing as minor constituents 0.015 wt % Mn and 0.015 wt % Si (e.g. Bayferrox 1360, commercial product of Bayer AG).

EXAMPLE 6

The procedure is as in Example 1, but as the iron oxide a mixture of equal parts of the oxides described in Example 1 and Example 3 is used.

Comparative Examples

EXAMPLE 7

The procedure is as in Example 1, but an iron oxide is used consisting of isometric particles (alpha-$Fe_2O_3$) of average size 0.09 μm, having a specific surface area of 18 $m^2/g$ and containing as minor constituents 0.07 wt % Mn and 1 wt % Si (e.g. Bayferrox 110M, commercial product of Bayer AG).

EXAMPLE 8

The procedure is as in Example 1, but an iron oxide is used consisting of isometric particles (alpha-$Fe_2O_3$) of average size 0.17 μm, having a specific surface area of 8 $m^2/g$ and containing as minor constituents 0.08 wt % Mn and 1 wt % Si (e.g. Bayferrox 130, commercial product of Bayer AG).

EXAMPLE 9

The procedure is as in Example 1, but an iron oxide is used consisting of isometric particles ($Fe_3O_4$) of average size 0.2 μm, having a specific surface area of 10 $m^2/g$ and containing as minor constituents 0.7% Mn and 1.1% Si (e.g. Bayferrox 318, commercial product of Bayer AG).

TABLE 1

CIELAB data of ceramic tiles

| Example No. | Pigmentation % | Firing temp. °C. | L* | a* | b* | C* | relative tinting strength % | C* × relative tinting strength | Mn ppm | Si ppm |
| --- | --- | --- | --- | --- | --- | --- | --- | --- | --- | --- |
| 1 | 5 | 1180 | 46.1 | 20.3 | 24.6 | 31.9 | 100 | 3190 | 350 | 150 |
| 2 | 5 | 1215 | 40.5 | 14 | 16.9 | 21.9 | 145 | 3176 | 350 | 150 |
| 3 | 5 | 1180 | 40.6 | 17.5 | 15.8 | 23.6 | 144 | 3398 | 100 | 100 |
| 4 | 5 | 1215 | 37.9 | 13.5 | 12.3 | 18.3 | 173 | 3166 | 100 | 100 |
| 5 | 5 | 1180 | 39.4 | 16.3 | 13.1 | 20.9 | 156 | 3260 | 150 | 150 |
| 6 | 5 | 1180 | 43.7 | 17.8 | 18.7 | 25.8 | 117 | 3019 | 125 | 125 |
| Comparative Examples | | | | | | | | | | |
| 7 | 5 | 1180 | 54 | 15.3 | 22.4 | 27.1 | 59 | 1599 | 700 | 10,000 |
| 8 | 5 | 1180 | 48.4 | 20 | 20.5 | 28.6 | 86 | 2460 | 800 | 10,000 |
| 9 | 5 | 1180 | 43.7 | 12.6 | 12.2 | 17.5 | 117 | 2048 | 700 | 11,000 |
| Ceramic Colour Standards Series II (British Ceramic Research Association Ltd.) | | | | | | | | | | |
| Mid Grey | | | 59.1 | −0.1 | 0.2 | 0.2 | 42 | | | |
| Deep Pink | | | 45.8 | 24.3 | 4.8 | 24.8 | 102 | | | |

L*: lightness
a*: value on the red-green-axis in the CIELAB-system
b*: value on the blue-yellow-axis in the CIELAB-system
C*: colour saturation, chroma

What is claimed is:

1. In a process for the preparation of red ceramic molded bodies comprising stoneware clay and containing iron oxide pigments by rapid firing, the improvement which comprises the iron oxide pigments having a Si content of 100 to less than 5000 ppm and a Mn content of 100 to less than 600 ppm, and wherein, for said molded bodies, the product of the relative tinting strength and the color saturation is a value exceeding 2600.

2. The process of claim 1, wherein the iron oxide is selected from alpha-FeOOH, gamma-FeOOH, alpha-$Fe_2O_3$, $Fe_3O_4$, or mixtures thereof.

3. A molded red ceramic body produced by the process of claim 1, containing 1 to 10% by weight iron oxide pigments, calculated as $Fe_2O_3$.

4. The molded red ceramic body as claimed in claim 3, containing 3 to 7% by weight iron oxide pigments, calculated as $Fe_2O_3$.

5. The molded red ceramic body of claim 3, wherein the relative tinting strength exceeds 50% and the color saturation exceeds 15 CIELAB units.

6. The molded red ceramic body of claim 4, wherein the relative tinting strength color exceeds 50% and the colour saturation exceeds 15 CIELAB units.

7. The molded red ceramic body of claim 5 wherein the body is a ceramic tile.

8. The molded red ceramic body of claim 6 wherein the body is a ceramic tile.

* * * * *